United States Patent
He et al.

(10) Patent No.: US 9,357,465 B2
(45) Date of Patent: May 31, 2016

(54) MULTIMODE HANDOVER METHOD AND MULTIMODE TERMINAL

(71) Applicant: Huawei Device Co., LTD, Shenzhen (CN)

(72) Inventors: Chunyong He, Xi'an (CN); Xiaojun Chen, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 206 days.

(21) Appl. No.: 14/023,121

(22) Filed: Sep. 10, 2013

(65) Prior Publication Data
US 2014/0011499 A1 Jan. 9, 2014

Related U.S. Application Data

(63) Continuation of application No. PCT/CN2012/079382, filed on Jul. 31, 2012.

(30) Foreign Application Priority Data

Feb. 28, 2012 (CN) .......................... 2012 1 0047357

(51) Int. Cl.
*H04W 36/00* (2009.01)
*H04W 36/30* (2009.01)
*H04W 36/32* (2009.01)

(52) U.S. Cl.
CPC .............. *H04W 36/30* (2013.01); *H04W 36/32* (2013.01); *H04W 36/0083* (2013.01)

(58) Field of Classification Search
CPC . H04W 48/16; H04W 36/14; H04W 36/0083; H04W 36/30; H04W 52/40; H04W 72/048; Y02B 60/50; H04L 27/38

USPC ................ 370/330, 328, 331, 329, 315, 252; 455/455, 552.1, 456.5, 436, 456.2, 455/90.2, 7, 11.1

See application file for complete search history.

(56) References Cited

U.S. PATENT DOCUMENTS

2008/0261597 A1 10/2008 Hayama et al.
2009/0016432 A1* 1/2009 Limberg .................. 375/240.01
(Continued)

FOREIGN PATENT DOCUMENTS

CN 101568132 A 10/2009
CN 101998555 A 3/2011
(Continued)

OTHER PUBLICATIONS

Chinese Office Action received in Application No. 201210047357.6 mailed Jan. 6, 2014, 3 pages.

(Continued)

*Primary Examiner* — Joseph Arevalo
(74) *Attorney, Agent, or Firm* — Slater Matsil, LLP

(57) ABSTRACT

A multimode handover method and a multimode terminal are disclosed. A multimode terminal obtains a CINR value and an RSSI value of a current signal in a first communication mode and determines whether the CINR value and the RSSI value both meet a preset switching condition. If they do, a current movement speed of the multimode terminal is obtained a switching delay is selected according to the movement speed, a second communication mode is switched into according to the selected delay, and communications use the second communication mode.

14 Claims, 5 Drawing Sheets

(56) References Cited

U.S. PATENT DOCUMENTS

| | | |
|---|---|---|
| 2009/0219892 A1 | 9/2009 | Kim et al. |
| 2009/0323832 A1* | 12/2009 | Senda .......................... 375/259 |
| 2010/0261496 A1* | 10/2010 | Fukumoto et al. ............ 455/517 |
| 2011/0189997 A1* | 8/2011 | Tiwari et al. .................. 455/443 |
| 2011/0216735 A1* | 9/2011 | Venkatachalam et al. .... 370/331 |
| 2011/0263257 A1 | 10/2011 | Kago et al. |
| 2012/0236745 A1* | 9/2012 | Nagai et al. ................... 370/252 |
| 2013/0053025 A1* | 2/2013 | Lindoff et al. ................. 455/424 |
| 2014/0141770 A1* | 5/2014 | Campos et al. ............ 455/426.1 |

FOREIGN PATENT DOCUMENTS

| | | |
|---|---|---|
| CN | 102572990 A | 7/2012 |
| JP | 2006121468 A | 5/2006 |
| JP | 2008270990 A | 11/2008 |
| JP | 2010087552 A | 4/2010 |
| JP | 2011-142650 A | 7/2011 |
| JP | 2011229084 A | 11/2011 |

OTHER PUBLICATIONS

International Search Report and Written Opinion received in Application No. PCT/CN2012/079382 mailed Oct. 4, 2012, 11 pages.

Notice of Reasons for Rejection received in Japanese Application 2012-239963 mailed Dec. 17, 2013, 6 pages.

* cited by examiner

MULTIMODE HANDOVER METHOD AND MULTIMODE TERMINAL

CROSS-REFERENCE TO RELATED APPLICATIONS

This application is a continuation of International Application No. PCT/CN2012/079382, filed on Jul. 31, 2012, which claims priority to Chinese Patent Application No. 201210047357.6, filed on Feb. 28, 2012, both of which are hereby incorporated by reference in their entireties.

TECHNICAL FIELD

The present invention relates to the field of communications, and in particular, to a multimode handover method and a multimode terminal.

BACKGROUND

With the development of wireless communication technologies, there are multiple wireless networks based on different wireless communication technologies. When a wireless network cannot continue to serve a multimode terminal due to reasons such as a geographical range, the multimode terminal can reselect an access network, and switch a communication mode on the current wireless network to a communication mode on a newly accessed wireless network. The current problem is how the multimode terminal switches the communication mode sensitively.

In the prior art, the multimode terminal judges whether to switch the communication mode according to the signal quality of the current wireless network. When the metrics of the signal quality meet a switching condition, the communication mode of the multimode terminal is switched.

When developing the present invention, the inventor finds at least the following defects in the prior art.

When a multimode terminal moving at a high speed is frequently handed over between different wireless networks, signals fluctuate dramatically, which causes frequent switching between communication modes and affects the user experience; if the switching delay of the communication mode is increased, a multimode terminal moving at a low speed cannot switch the communication mode sensitively, which also affects the user experience.

SUMMARY OF THE INVENTION

To reduce the switching frequency of communication modes and switch a communication mode sensitively, embodiments of the present invention provide a multimode handover method and a multimode terminal. The technical solutions provided in the embodiments of the present invention will be described herein.

In one aspect, a multimode handover method is provided, where the method includes obtaining, by a multimode terminal, a carrier to interference plus noise ratio CINR value and a received signal strength indicator RSSI value of a current signal in a first communication mode, and judging whether the CINR value and the RSSI value both meet a preset switching condition, and if true, obtaining a current movement speed of the multimode terminal, selecting a switching delay according to the movement speed, switching to a second communication mode according to the selected delay, and communicating by using the second communication mode.

In another aspect, a multimode terminal is further provided, where the terminal includes a first obtaining module, configured to obtain a carrier to interference plus noise ratio CINR value and a received signal strength indicator RSSI value of a current signal in a first communication mode, a judging module, configured to judge whether the CINR value and the RSSI value both meet a preset switching condition, a second obtaining module, configured to obtain a current movement speed of the multimode terminal after the judging module determines that the CINR value and the RSSI value both meet the preset switching condition, a selecting module, configured to select a switching delay according to the movement speed obtained by the second obtaining module, and a switching module, configured to switch to a second communication mode according to the delay selected by the selecting module, and communicate by using the second communication mode.

Embodiments of the present invention provide benefits.

After the CINR value and the RSSI value of a current signal in a first communication mode both meet a preset switching condition, the current movement speed of the multimode terminal is obtained, a switching delay is selected according to the movement speed, and the first communication mode is switched to a second communication mode. In this way, the problem of frequent switching between communication modes is avoided, and the sensitivity of switching a communication mode is increased, thereby improving the communication performance.

BRIEF DESCRIPTION OF THE DRAWINGS

For a better understanding of the technical solutions in the embodiments of the present invention, the accompanying drawings for illustrating the embodiments are briefly described below. Apparently, the accompanying drawings in the following description illustrate only some embodiments of the present invention, and a person of ordinary skill in the art may derive other accompanying drawings from these accompanying drawings without creative efforts.

DETAILED DESCRIPTION OF ILLUSTRATIVE EMBODIMENTS

For a better understanding of the objectives, technical solutions, and advantages of the present invention, the embodiments of the present invention are described in further detail below with reference to the accompanying drawings.

Figure 1:
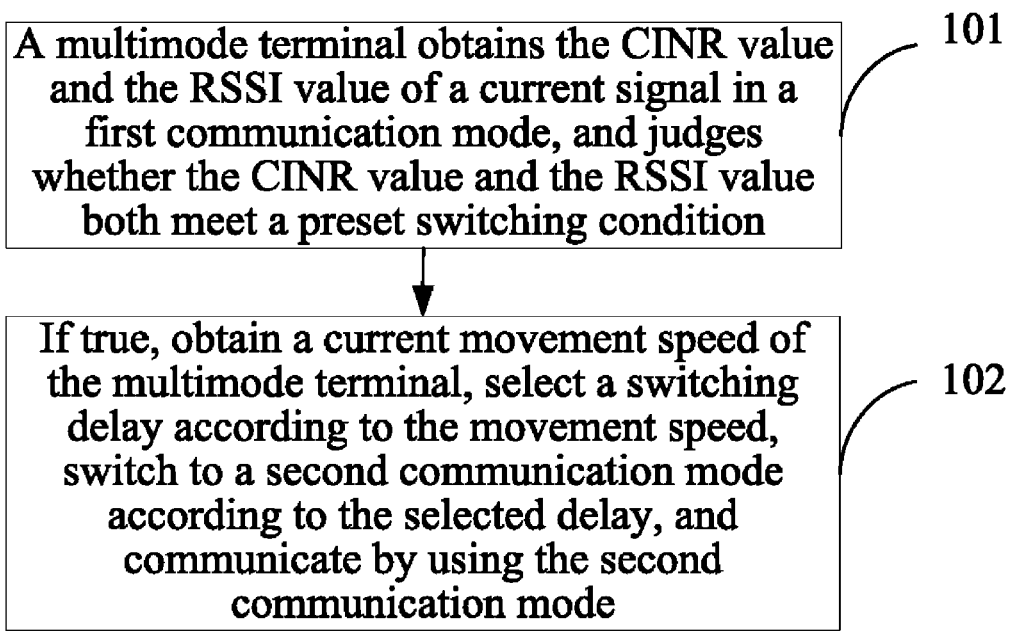
FIG. 1 is a flowchart of a multimode handover method according to a first embodiment of the present invention.

As shown in FIG. 1, a first embodiment provides a multimode handover method. The procedure of the method will be described now.

101. A multimode terminal obtains a CINR (Carrier to Interference plus Noise Ratio, carrier to interference plus noise ratio) value and an RSSI (Received Signal Strength Indication, received signal strength indicator) value of a current signal in a first communication mode, and judges whether the CINR value and the RSSI value both meet a preset switching condition.

102. If true, obtain a current movement speed of the multimode terminal, select a switching delay according to the movement speed, switch to a second communication mode according to the selected delay, and communicate by using the second communication mode.

The selecting a switching delay according to the movement speed includes judging whether the movement speed is greater than or equal to a preset speed threshold, if true, selecting a preset first delay as the switching delay, and otherwise, selecting a preset second delay as the switching delay, where the first delay is greater than the second delay.

Specifically, the switching to a second communication mode according to the selected delay includes starting timing after the delay is selected, and switching to the second communication mode when the selected delay expires.

Further, the switching to the second communication mode when the selected delay expires includes when the selected delay expires, judging whether the CINR value and the RSSI value always meet the preset switching condition within the selected delay, and if true, switching to the second communication mode.

Preferably, the judging whether the CINR value and the RSSI value both meet a preset switching condition includes judging whether the CINR value is greater than or equal to a preset CINR threshold and whether the RSSI value is greater than or equal to a preset RSSI threshold, and if true, determining that the CINR value and the RSSI value both meet the preset switching condition.

The communication mode of the multimode terminal includes but is not limited to a 3G (third generation mobile communication technology) communication mode, a WiMAX (Worldwide Interoperability for Microwave Access) communication mode, an LTE (Long Term Evolution) communication mode, a GSM (Global System of Mobile communication) communication mode, and a WiFi (Wireless Fidelity) communication mode, and the method for measuring the movement speed of the multimode terminal includes but is not limited to a GPS (Global Positioning System) speed measurement method, which are not limited in the present invention.

By using the multimode handover method provided in this embodiment, after the CINR value and the RSSI value of a current signal in a first communication mode both meet a preset switching condition, the current movement speed of the multimode terminal is obtained, a switching delay is selected according to the movement speed, and the multimode terminal switches to a second communication mode. In this way, the problem of frequent switching between communication modes is avoided, and the sensitivity of switching a communication mode is increased, thereby improving the communication performance.

In addition, the first delay is selected as the switching delay when the multimode terminal moves at a high speed, and the second delay is selected as the switching delay when the multimode terminal moves at a low speed, where the first delay is greater than the second delay. In this way, the problem of insensitive switching is avoided when the communication mode is switched by using a same delay, thereby improving the communication performance. Furthermore, whether the CINR value and RSSI value of the current signal always meet the switching condition is measured and judged within the selected delay; if the current signal always meets the switching condition within the selected delay, the communication mode is switched, which ensures the stability of the signal quality and improves the user experience.

Figure 2:
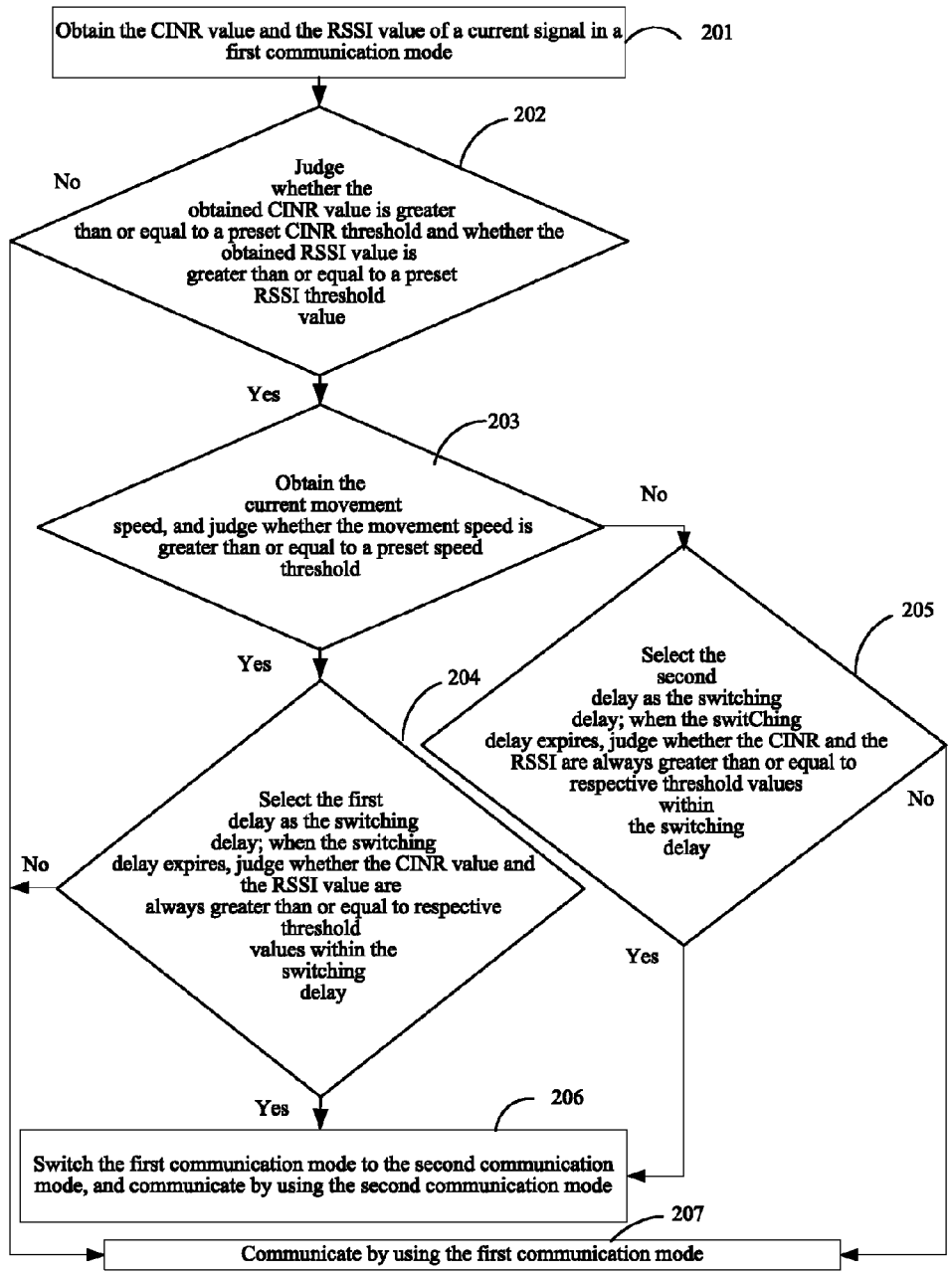
FIG. 2 is a flowchart of a multimode handover method according to a second embodiment of the present invention.

To further describe the multimode handover method provided in the first embodiment, the following describes, by taking a second embodiment as an example, the multimode handover method in detail with reference to the first embodiment. Details are provided in the following second embodiment:

As shown in FIG. 2, a second embodiment provides a multimode handover method. The procedure of the method will now be discussed.

201. A multimode terminal obtains a CINR value and an RSSI value of a current signal in a first communication mode.

The CINR refers to a carrier to interference plus noise ratio. To ensure that the multimode terminal can cancel interference and decode a received signal correctly, the CINR of the received signal must be in an acceptable range. The RSSI is an optional part of the wireless transmission layer and is used to judge the link quality. To avoid excessive attenuation of the signal and ensure that the multimode terminal can receive the signal with certain strength, the RSSI of the received signal must be in an acceptable range. Therefore, the CINR and the RSSI are key indicators used to measure the signal quality on the wireless network.

In the movement process, the multimode terminal needs to measure the quality of a current signal in a first communication mode; if the signal quality meets a condition for switching to a second communication mode, the first communication mode of the multimode terminal is switched to the second communication mode for communication; if the signal quality fails to meet the condition for switching to the second communication mode, the communication mode of the multimode terminal is not switched. The metrics of the signal quality are the CINR and the RSSI. Therefore, the multimode terminal needs to calculate the CINR value and the RSSI value of the signal, and judge whether the CINR value and the RSSI value meet the preset switching condition for switching to the second communication mode.

Specifically, the multimode terminal may obtain the CINR value and the RSSI value by a lot of methods, for example, the multimode terminal obtains the carrier power C of a user in a wireless communication system and the noise interference NI of a cell in the wireless communication system, and divides the carrier power C by the noise interference NI to obtain the CINR value. Then, the multimode terminal adds the weighted carrier power C to the noise interference NI to obtain the RSSI value. This embodiment does not specifically limit the method for obtaining the CINR value and the RSSI value by the multimode terminal.

202. The multimode terminal judges whether the obtained CINR value is greater than or equal to a preset CINR threshold and whether the obtained RSSI value is greater than or equal to a preset RSSI threshold; if true, 203 is executed; otherwise, 207 is executed.

According to this step, the multimode terminal needs to preset a CINR threshold and an RSSI threshold for switching to the second communication mode. The multimode terminal compares the obtained CINR value and RSSI value with the preset thresholds respectively; when the CINR value is greater than or equal to the preset CINR threshold and the RSSI value is greater than or equal to the preset RSSI threshold, step 203 is executed; otherwise, when the signal quality in the current first communication mode cannot meet the switching condition, step 207 is executed.

In this embodiment, the CINR threshold and the RSSI threshold may be set according to the actual need and may be modified, which is not specifically limited in the present invention.

203. The multimode terminal obtains a current movement speed, and judges whether the movement speed is greater than or equal to a preset speed threshold; if true, 204 is executed; otherwise, 205 is executed.

According to this step, because the geographical range of the current wireless network may overlap the geographical range of the newly accessed wireless network, the multimode terminal is frequently handed over between the current wireless network and the newly accessed wireless network, which causes dramatic fluctuation of signals and frequent switching between communication modes. To avoid the switching between communication modes due to this case, a switching delay is further set in this embodiment according to the movement speed of the multimode terminal after it is determined that the CINR value and the RSSI value of the current signal both meet the preset switching condition. When the movement speed of the multimode terminal is greater than or equal to the preset speed threshold, the frequency of switching between communication modes is high, and a long first delay may be set as the switching delay; when the movement speed of the multimode terminal is smaller than the preset speed threshold, the frequency of switching between communication modes is relatively low, and a short second delay may be set as the switching delay; in addition, the first delay is greater than the second delay, so that the multimode terminal switches the communication mode more sensitively and more accurately.

Specifically, the multimode terminal needs to preset a speed threshold and obtain the movement speed of the multimode terminal by using the GPS, and then compare the obtained movement speed with the preset speed threshold. If the movement speed of the multimode terminal obtained by the GPS is greater than or equal to the preset speed threshold, step 204 is executed; otherwise, step 205 is executed. The speed threshold may be set or modified according to the actual need, which is not specifically limited in the present invention.

Further, the multimode terminal may obtain the current movement speed by a lot of methods, for example, the GPS is used to locate the multimode terminal in a fixed time segment T0, so as to obtain the shift S0 of the multimode terminal in this time segment, and the shift S0 is divided by the time T0 to calculate the movement speed of the multimode terminal. Certainly, it is understandable by a person skilled in the art that there are multiple methods for measuring the speed in the prior art, for example, the speed is measured by adding a speed sensor on condition that an initial speed is set. This embodiment does not specifically limit the method for obtaining the movement speed by the multimode terminal.

204. The multimode terminal selects the first delay as the switching delay, and starts timing; when the switching delay expires, the multimode terminal judges whether the CINR value and the RSSI value are always greater than or equal to respective thresholds within the switching delay; if true, 206 is executed; otherwise, 207 is executed.

Because it is determined that the movement speed of the multimode terminal is greater than or equal to the preset speed threshold in step 203, the multimode terminal selects the first delay as the switching delay, and judges whether the CINR and the RSSI are always greater than or equal to respective preset thresholds within the selected first delay; if the CINR and the RSSI are always greater than or equal to the respective preset thresholds within the selected first delay, the signal quality is relatively stable, and the communication mode can be switched, that is, step 206 is executed; otherwise, the signal quality is unstable, and the communication mode of the multimode terminal is not switched, that is, step 207 is executed.

205. The multimode terminal selects the second delay as the switching delay, and starts timing; when the switching delay expires, the multimode terminal judges whether the CINR and the RSSI are always greater than or equal to the respective thresholds within the switching delay; if true, 206 is executed; otherwise, 207 is executed. Herein, the first delay is greater than the second delay.

Because it is determined that the movement speed of the multimode terminal is smaller than the preset speed threshold in step 203, the multimode terminal selects the second delay as the switching delay, and judges whether the CINR and the RSSI are always greater than or equal to the respective preset thresholds within the selected second delay; if the CINR and the RSSI are always greater than or equal to the respective preset thresholds, the signal quality is relatively stable, and the communication mode can be switched, that is, step 206 is executed; otherwise, the signal quality is unstable, and the communication mode of the multimode terminal is not switched.

206. The multimode terminal switches the first communication mode to the second communication mode, and communicates by using the second communication mode. Then, the procedure ends.

According to this step, because the multimode terminal determines that the signal quality of the current first network meets the switching condition and the signal quality is stable, the multimode terminal switches the first communication mode to the second communication mode, and communicates by using the second communication mode.

207. The multimode terminal communicates by using the first communication mode. Then, the procedure ends.

According to this step, because the multimode terminal determines that the current signal quality in the first communication mode is unstable and does not meet the condition for switching to the second communication mode, the multimode terminal continues to communicate by using the current first communication mode.

For better description, this embodiment describes a procedure for switching from the 3G communication mode to the WiMAX communication mode by a dual-mode terminal based on the following assumptions: The 3G communication mode and the WiMAX communication mode are supported and a dual-mode terminal with the GPS speed measurement function is used. The dual-mode terminal firstly judges whether the CINR value and the RSSI value of the current signal in the 3G communication mode both meet a preset switching condition. For example, the threshold of the CINR is set to 10 db and the threshold of the RSSI is set to −80 dbm. The preset switching condition is that the CINR value is greater than or equal to 10 db and that the RSSI value is greater than or equal to −80 dbm. If determining that the CINR value and the RSSI value do not meet the switching condition, the dual-mode terminal continues to communicate by using the current 3G communication mode until the procedure ends; if determining that the CINR value and the RSSI value both meet the switching condition, the dual-mode terminal obtains the movement speed of the dual-mode terminal, and compares the obtained movement speed with the preset speed threshold (for example, 20 Km/h).

If the obtained movement speed is greater than or equal to the preset speed threshold, the dual-mode terminal selects the long first delay as the switching delay and starts timing; when the switching delay expires, the dual-mode terminal judges whether the CINR value and the RSSI value are always greater than or equal to respective preset thresholds within the switching delay; if true, the dual-mode terminal switches from the current 3G communication mode to the WiMAX communication mode, and communicates by using the WiMAX communication mode; otherwise, the dual-mode terminal continues to communicate by using the current 3G communication mode until the procedure ends.

If the obtained movement speed is smaller than the preset speed threshold, the dual-mode terminal selects the short second delay as the switching delay, where the first delay is greater than the second delay, and starts timing; when the switching delay expires, the dual-mode terminal judges whether the CINR value and the RSSI value are always greater than or equal to respective preset thresholds within the switching delay; if true, the dual mode terminal switches the current 3G communication mode to the WiMAX communication mode, and communicates by using the WiMAX communication mode; otherwise, the dual-mode terminal continues to communicate by using the current 3G communication mode. Then, the procedure ends.

By using the multimode handover method provided in this embodiment, after the CINR value and the RSSI value of a current signal in a first communication mode both meet a preset switching condition, the current movement speed of the multimode terminal is obtained, a switching delay is selected according to the movement speed, and the multimode terminal switches to a second communication mode. In this way, the problem of frequent switching between communication modes is avoided, and the sensitivity of switching a communication mode is increased, thereby improving the communication performance.

In addition, the first delay is selected as the switching delay when the multimode terminal moves at a high speed, and the second delay is selected as the switching delay when the multimode terminal moves at a low speed, where the first delay is greater than the second delay. In this way, the problem of insensitive switching is avoided when the communication mode is switched by using a same delay, thereby improving the communication performance. Furthermore, whether the CINR value and RSSI value of the current signal always meet the switching condition is measured and judged within the selected delay; if the current signal always meets the switching condition within the selected delay, the communication mode is switched, which ensures the stability of the signal quality and improves the user experience.

Figure 3:
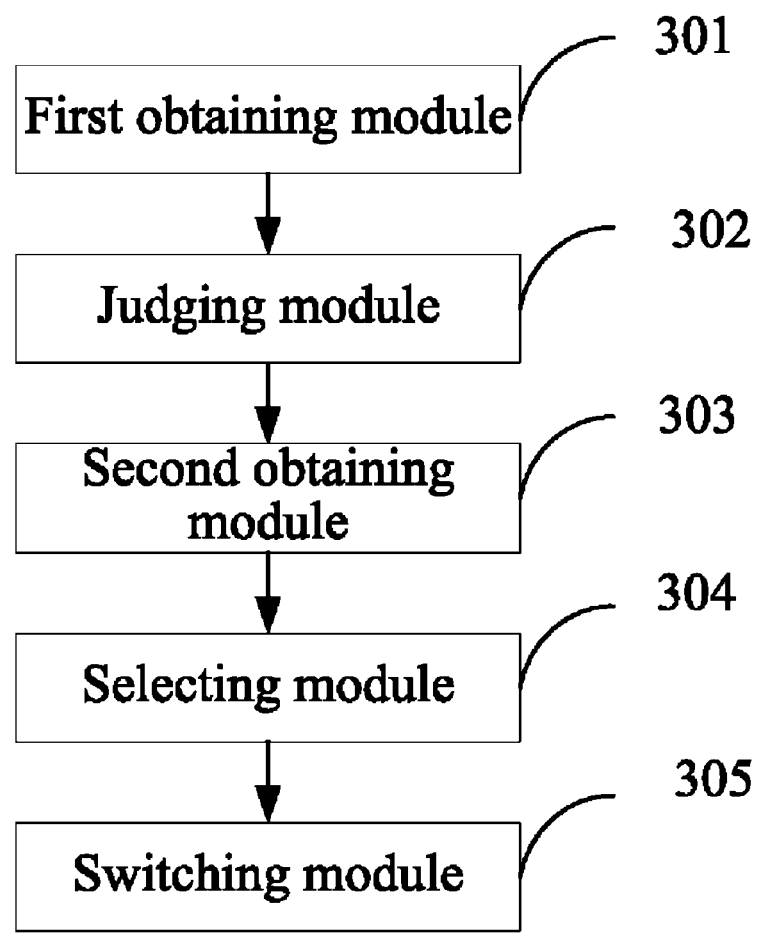
FIG. 3 is a schematic structural diagram of a multimode terminal according to a third embodiment of the present invention.

As shown in FIG. 3, a third embodiment provides a multimode terminal. The terminal includes a first obtaining module 301, configured to obtain a CINR value and an RSSI value of a current signal in a first communication mode, a judging module 302, configured to judge whether the CINR value and the RSSI value both meet a preset switching condition, a second obtaining module 303, configured to obtain a current movement speed of the multimode terminal after the judging module 302 determines that the CINR value and the RSSI value both meet the preset switching condition, a selecting module 304, configured to select a switching delay according to the movement speed obtained by the second obtaining module 302, and a switching module 305, configured to switch to a second communication mode according to the delay selected by the selecting module 304, and communicate by using the second communication mode.

Figure 4:
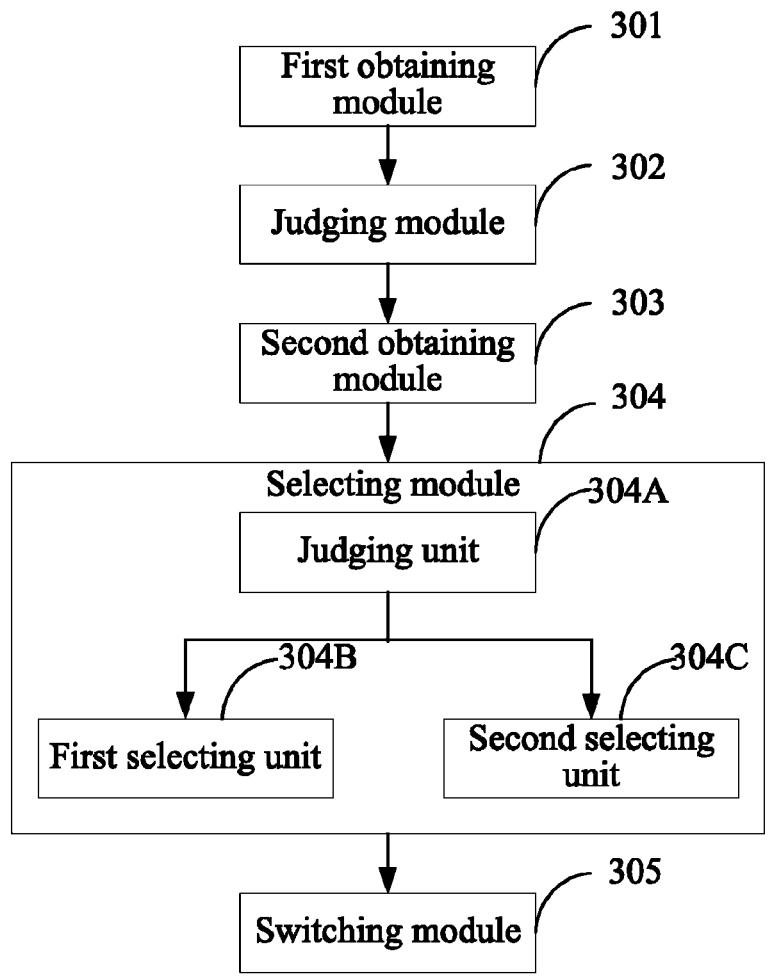
FIG. 4 is a schematic structural diagram of another multimode terminal according to the third embodiment of the present invention.

In this embodiment, as shown in FIG. 4, the selecting module 304 includes a judging unit 304A, configured to judge whether the movement speed obtained by the second obtaining module 303 is greater than or equal to a preset speed threshold, a first selecting unit 304B, configured to select a preset first delay as the switching delay after the judging unit 304A determines that the movement speed is greater than or equal to the preset speed threshold, and a second selecting unit 304C, configured to select a preset second delay as the switching delay after the judging unit 304A determines that the movement speed is smaller than the preset speed threshold, where the first delay is greater than the second delay.

Figure 5:
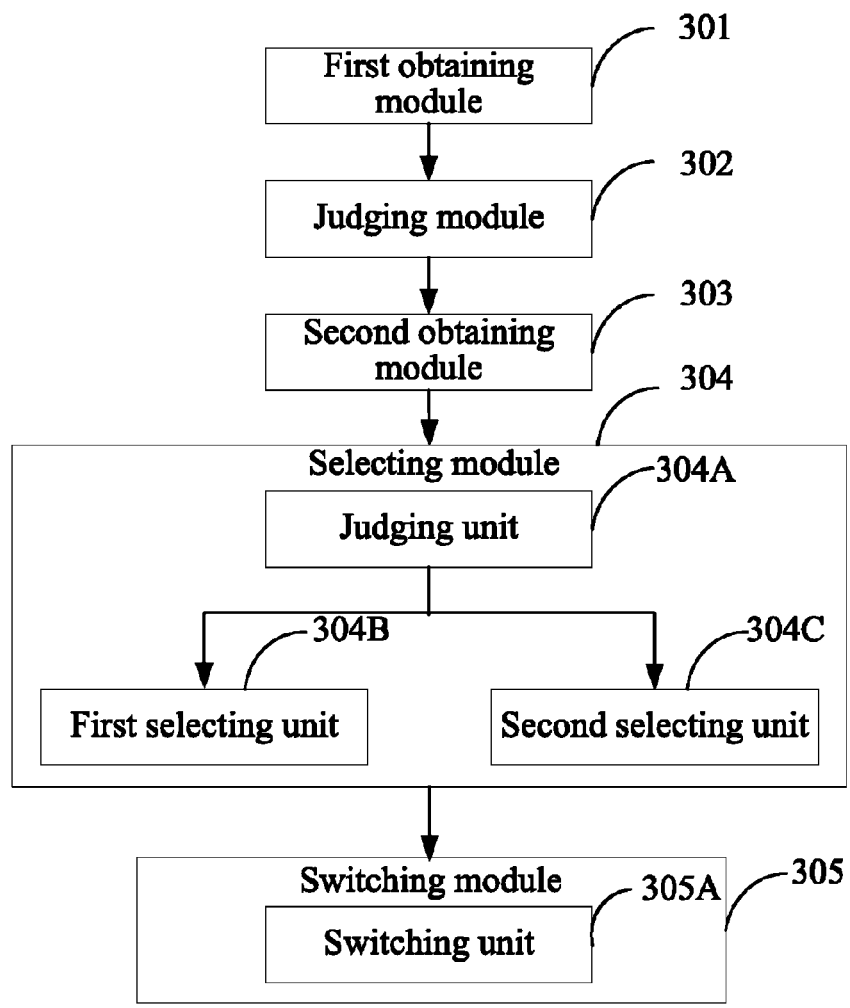
FIG. 5 is a schematic structural diagram of still another multimode terminal according to the third embodiment of the present invention.

In this embodiment, as shown in FIG. 5, the switching module 305 includes a switching unit 305A, configured to start timing after the selecting module 304 selects the delay, and switch to the second communication mode when the delay selected by the selecting module 304 expires.

In this embodiment, the judging module 302 is specifically configured to judge whether the CINR value and the RSSI value obtained by the first obtaining module 301 always meet the preset switching condition within the delay selected by the selecting module 304, when the selected delay expires.

The switching module 305 is further configured to switch to the second communication mode after the judging module 302 determines that the CINR value and the RSSI value always meet the preset switching condition within the delay selected by the selecting module 304.

In this embodiment, the judging module 302 is specifically configured to: judge whether the CINR value is greater than or equal to a preset CINR threshold and whether the RSSI value is greater than or equal to a preset RSSI threshold; if true, determine that the CINR value and the RSSI value both meet the preset switching condition.

The communication mode of the multimode terminal includes but is not limited to a 3G communication mode, a WiMAX communication mode, an LTE communication mode, a GSM communication mode, and a WiFi communication mode, and a movement speed measuring module of the multimode terminal includes but is not limited to a GPS.

The multimode terminal provided in this embodiment can execute the multimode handover method provided in any one embodiment of the method. The specific process is described in the embodiments of the method, and is not further described herein.

By using the multimode terminal provided in this embodiment, after the CINR value and the RSSI value of a current signal in a first communication mode both meet a preset switching condition, the current movement speed of the multimode terminal is obtained, a switching delay is selected according to the movement speed, and the multimode terminal switches to a second communication mode. In this way, the problem of frequent switching between communication modes is avoided, and the sensitivity of switching a communication mode is increased, thereby improving the communication performance of the multimode terminal.

In addition, the first delay is selected as the switching delay when the multimode terminal moves at a high speed, and the second delay is selected as the switching delay when the multimode terminal moves at a low speed, where the first delay is greater than the second delay. In this way, the problem of insensitive switching is avoided when the communication mode is switched by using a same delay, thereby improving the communication performance of the multimode terminal. Furthermore, whether the CINR value and RSSI value of the current signal always meet the switching condition is measured and judged within the selected delay; if the current signal always meets the switching condition within the selected delay, the communication mode is switched, which ensures the stability of the signal quality and improves the user experience.

It should be noted that the division of the above functional modules is only an example when the multimode terminal provided in this embodiment performs multimode switching. In the actual applications, the above functions may be implemented by different functional modules according to the actual need, that is, different functional modules are divided according to the internal structure of the terminal to complete all or part of the above functions. In addition, the embodiments of the multimode terminal and the multimode handover method provided in the above embodiments are based on the same idea. The specific implementation process is disclosed in the embodiments of the method, and is not further described herein.

The sequence numbers of the preceding embodiments of the present invention are merely for description purpose but do not indicate the preference of the embodiments.

All or part of the steps according to the embodiments of the present invention may be implemented by using software, and the corresponding software programs may be stored in a readable storage medium, such as a compact disk or a hard disk.

The foregoing describes only exemplary embodiments of the present invention and is not intended to limit the present invention. Any modification, equivalent replacement, or improvement made without departing the spirit and principle of the present invention shall fall within the protection scope of the present invention.

What is claimed is:

1. A multimode handover method, comprising:
obtaining, by a multimode terminal, a carrier to interference plus noise ratio (CINR) value and a received signal strength indicator (RSSI) value of a current signal in a first communication mode;
determining whether the CINR value and the RSSI value both meet a preset switching condition; and
in response to the CINR value and the RSSI value both meeting the preset switching condition:
obtaining a current movement speed of the multimode terminal;
selecting a switching delay according to the movement speed, the selecting comprising:
determining whether or not the movement speed is greater than or equal to a preset speed threshold;
in response to the movement speed being greater than or equal to the preset threshold, selecting a preset first delay as the switching delay; and
in response to the movement speed not being greater than or equal to the preset speed threshold, selecting a preset second delay as the switching delay, wherein the first delay is greater than the second delay;
switching to a second communication mode according to the selected switching delay; and
communicating by using the second communication mode.

2. The method according to claim 1, wherein switching to the second communication mode according to the selected switching delay comprises:
starting timing after the delay is selected; and
switching to the second communication mode when the selected switching delay expires.

3. The method according to claim 2, wherein switching to the second communication mode when the selected switching delay expires comprises:
when the selected switching delay expires, determining whether the CINR value and the RSSI value always meet the preset switching condition within the selected switching delay; and if the CINR value and the RSSI value always meet the preset switching condition within the selected switching delay, switching to the second communication mode.

4. The method according to claim 1, where determining whether the CINR value and the RSSI value both meet a preset switching condition comprises:
determining whether the CINR value is greater than or equal to a preset CINR threshold and whether the RSSI value is greater than or equal to a preset RSSI threshold.

5. The method according to claim 1, where determining whether the CINR value and the RSSI value both meet a preset switching condition comprises determining whether the CINR value is greater than or equal to a preset CINR threshold and whether the RSSI value is greater than or equal to a preset RSSI threshold.

6. A multimode terminal, comprising:
a processor; and
a computer-readable storage medium storing a program to be executed by the processor, the program including instructions for:
obtaining a carrier to interference plus noise ratio (CINR) value and a received signal strength indicator (RSSI) value of a current signal in a first communication mode;
determining whether the CINR value and the RSSI value both meet a preset switching condition;
obtaining a current movement speed of the multimode terminal after determining that the CINR value and the RSSI value both meet the preset switching condition;
determining whether the movement speed obtained is greater than or equal to a preset speed threshold;
selecting a switching delay according to the movement speed, comprising:
selecting a preset first delay as the switching delay in response to determining that the movement speed is greater than or equal to the preset speed threshold; and
selecting a preset second delay as the switching delay in response to determining that the movement speed is less than the preset speed threshold, wherein the first delay is greater than the second delay; and
switching to a second communication mode according to the delay selected and communicating using the second communication mode.

7. The terminal according to claim 6, wherein the program further includes instructions for:
starting timing after the selecting of the delay and switching to the second communication mode when the delay selected expires.

8. The terminal according to claim 7, wherein the program further includes instructions for:
determining whether the CINR value and the RSSI value obtained always meet the preset switching condition within the delay selected, when the selected delay expires; and
switching to the second communication mode after determining that the CINR value and the RSSI value always meet the preset switching condition within the delay selected.

9. The terminal according to claim 6, wherein the program further includes instructions for determining whether the CINR value is greater than or equal to a preset CINR threshold and whether the RSSI value is greater than or equal to a preset RSSI threshold.

10. A multimode handover method, comprising:
obtaining, by a multimode terminal, a carrier to interference plus noise ratio (CINR) value and a received signal strength indicator (RSSI) value of a current signal in a first communication mode, wherein the CINR value and the RSSI value both meet a preset switching condition;

obtaining a current movement speed of the multimode terminal;

selecting a switching delay according to the movement speed, comprising:

determining whether or not the movement speed is greater than or equal to a preset speed threshold;

in response to the movement speed being greater than or equal to the preset threshold, selecting a preset first delay as the switching delay; and in response to the movement speed not being greater than or equal to the preset speed threshold, selecting a preset second delay as the switching delay, wherein the first delay is greater than the second delay;

switching to a second communication mode according to the selected switching delay; and communicating by using the second communication mode.

11. The method according to claim 10, wherein switching to the second communication mode according to the selected switching delay comprises:

starting timing after the delay is selected; and switching to the second communication mode when the selected switching delay expires.

12. The method according to claim 11, wherein switching to the second communication mode when the selected switching delay expires comprises:

when the selected switching delay expires, determining whether the CINR value and the RSSI value always meet the preset switching condition within the selected switching delay; and if the CINR value and the RSSI value always meet the preset switching condition within the selected switching delay, switching to the second communication mode.

13. The method according to claim 10, further comprising determining that the CINR value and the RSSI value both meet the preset switching condition.

14. The method according to claim 13, where the determining comprises determining whether the CINR value is greater than or equal to a preset CINR threshold and whether the RSSI value is greater than or equal to a preset RSSI threshold.

* * * * *